US011591028B2

(12) United States Patent
Menez Sánchez (10) Patent No.: US 11,591,028 B2
(45) Date of Patent: Feb. 28, 2023

(54) FRONT END MODULE ASSEMBLY (71) Applicant: NISSAN NORTH AMERICA, INC., Franklin, TN (US)

(72) Inventor: Alvaro Menez Sánchez, Estado de México (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 170 days.

(21) Appl. No.: 16/917,845

(22) Filed: Jun. 30, 2020

(65) Prior Publication Data

US 2021/0403095 A1  Dec. 30, 2021

(51) Int. Cl.
  *B62D 25/08*    (2006.01)
  *B60K 11/04*    (2006.01)
  *B62D 27/06*    (2006.01)

(52) U.S. Cl.
  CPC ............ *B62D 25/085* (2013.01); *B60K 11/04* (2013.01); *B62D 25/084* (2013.01); *B62D 27/065* (2013.01)

(58) Field of Classification Search
  CPC ..... B62D 25/084; B62D 25/085; B60K 11/04
  USPC .................................................... 296/193.09
  See application file for complete search history.

(56) References Cited

U.S. PATENT DOCUMENTS

| 5,046,554 | A  | * | 9/1991  | Iwasaki ................. | B60K 11/04 |
|           |    |   |         |                          | 165/44 |
| 7,121,369 | B2 |   | 10/2006 | Beck et al. | |
| 8,376,073 | B2 |   | 2/2013  | Nantais et al. | |
| 9,261,011 | B2 | * | 2/2016  | Keerl ...................... | F28F 21/06 |
| 9,863,719 | B2 |   | 1/2018  | Gopireddy et al. | |
| 10,295,277 | B2 | * | 5/2019 | Giordano .............. | F28D 1/0435 |
| 10,619,931 | B2 | * | 4/2020 | Han ...................... | B60H 1/3227 |
| 10,865,693 | B2 | * | 12/2020 | Han ......................... | F01P 3/18 |
| 11,014,440 | B2 | * | 5/2021 | Glickman ............. | B33Y 80/00 |
| 2014/0116658 | A1 | * | 5/2014 | Kappelman ........... | B60K 11/04 |
|           |    |   |         |                          | 165/121 |
| 2016/0001629 | A1 | * | 1/2016 | Rohr ...................... | F28F 9/002 |
|           |    |   |         |                          | 165/76 |
| 2020/0101817 | A1 | * | 4/2020 | Ohlhoff .................. | B60K 11/08 |
| 2022/0016971 | A1 | * | 1/2022 | Merz ...................... | B60K 11/08 |

FOREIGN PATENT DOCUMENTS

| DE | 102011107211 A1 | * | 1/2013 | ............ B60K 11/04 |
| DE | 102012112704 A1 |   | 6/2014 | |
| GB | 2262600 A       |   | 6/1993 | |

* cited by examiner

*Primary Examiner* — Jason S Morrow
(74) *Attorney, Agent, or Firm* — Global IP Counselors, LLP (57) ABSTRACT

A front end module assembly has a front end module structure of a vehicle, a heat exchanger support and a first heat exchanger unit. The heat exchanger support is supported to the vehicle front end module structure. The heat exchanger support has an opening. The first heat exchanger unit is accommodated in the opening of the heat exchanger support so that the transmission cooler is supported to the vehicle front end module structure via the heat exchanger support.

20 Claims, 8 Drawing Sheets

FRONT END MODULE ASSEMBLY

BACKGROUND

Field of the Invention

The present invention generally relates to vehicle front end module assembly. More specifically, the present invention relates to vehicle front end module assembly having one or more heat exchangers.

Background Information

Front end module heat exchangers perform most efficiently when large quantities of air can be used to remove heat from the fluid inside the heat exchangers. Front end modules heat exchangers include radiators, condensers, transmission oil coolers, etc. The radiator fluid (coolant), the condenser fluid (refrigerant), and transmission oil cooler fluid (transmission oil) become hot during vehicle operation. Air entering the vehicle grill can cool the heat exchanges and the fluid inside the heat exchangers. Because the heat exchangers of the front end module are more effective when air reaches the heat exchangers without being blocked. Engineers try to optimize the unblocked area of the front end module and this is called the effective frontal area of the front end module. However, engineers also need to optimize many other systems in the vehicle so airflow to the front end module heat exchangers is sometimes not the highest priority. So engineers make tradeoffs and many of these tradeoffs reduce airflow to the front end module heat exchangers. Other systems that need to be optimized include: front end styling, aerodynamics, bumper geometry, sealing between the bumper fascia and front end module, hood latch, attachment features for various parts and other features.

SUMMARY

In view of the state of the known technology, one aspect of the present disclosure is to provide a front end module assembly comprising a front end module structure of a vehicle, a heat exchanger support and a first heat exchanger unit. The heat exchanger support is supported to the vehicle front end module structure. The heat exchanger support has an opening. The first heat exchanger unit is accommodated in the opening of the heat exchanger support so that the transmission cooler is supported to the vehicle front end module structure via the heat exchanger support.

In view of the state of the known technology, another aspect of the present disclosure is to provide a heat exchanger assembly comprising a heat exchanger support and a transmission cooler. The heat exchanger support is configured to be supported to a vehicle front end module structure. The heat exchanger support spans substantially an entire width of the front end module structure. The heat exchanger support has an accommodating portion. The transmission cooler is accommodated in the accommodating portion of the heat exchanger support so that the transmission cooler is configured to be supported to the vehicle front end module structure via the heat exchanger support.

In view of the state of the known technology, another aspect of the present disclosure is to provide a heat exchanger support comprising a frame portion and at least one first support arm. The frame portion has an opening for accommodating a heat exchanger unit. The at least one first support arm extends from an outer perimeter of the frame portion to be attached to a vehicle front end structure. The frame portion includes a plurality of apertures spanning from the opening to the outer perimeter of the frame portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
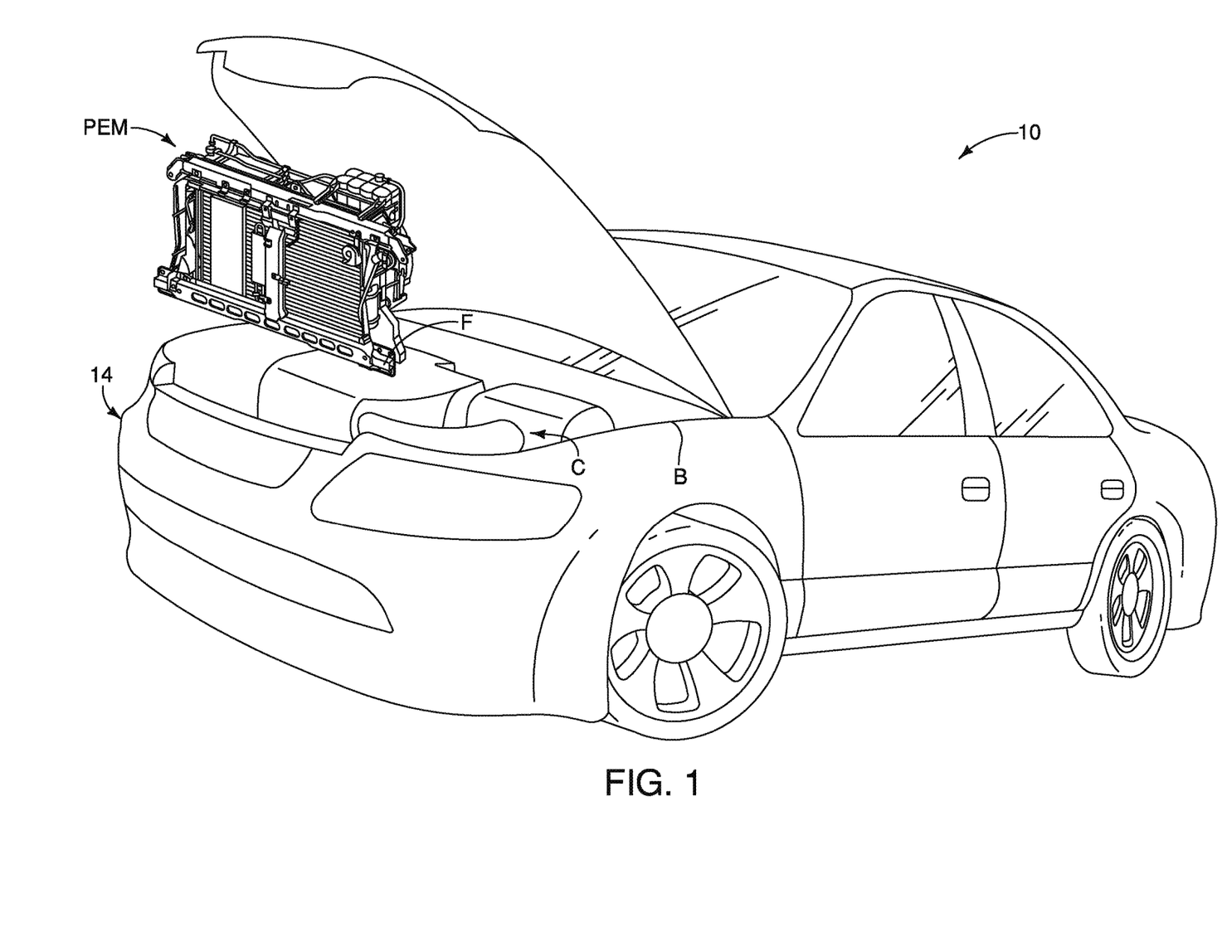
FIG. 1 is a front perspective view of a vehicle equipped with a conventional front end module.

Referring initially to FIG. 1, a vehicle 10 is illustrated as including a conventional front end module (FEM). FEMs can include one or more heat exchangers for heating and/or cooling various components of the vehicle 10. In particular, as shown in FIG. 1, the FEM includes a radiator core R having cooling fins, and the FEM is encased in a frame structure F before installation into the vehicle 10. FEMs can be fixed to the vehicle's body structure B by one or more mounting brackets, frames, or structures of FEM. The FEM is then secured in the vehicle's engine compartment C by bolts, rivets or any other suitable fastening mechanisms.

Figure 2:
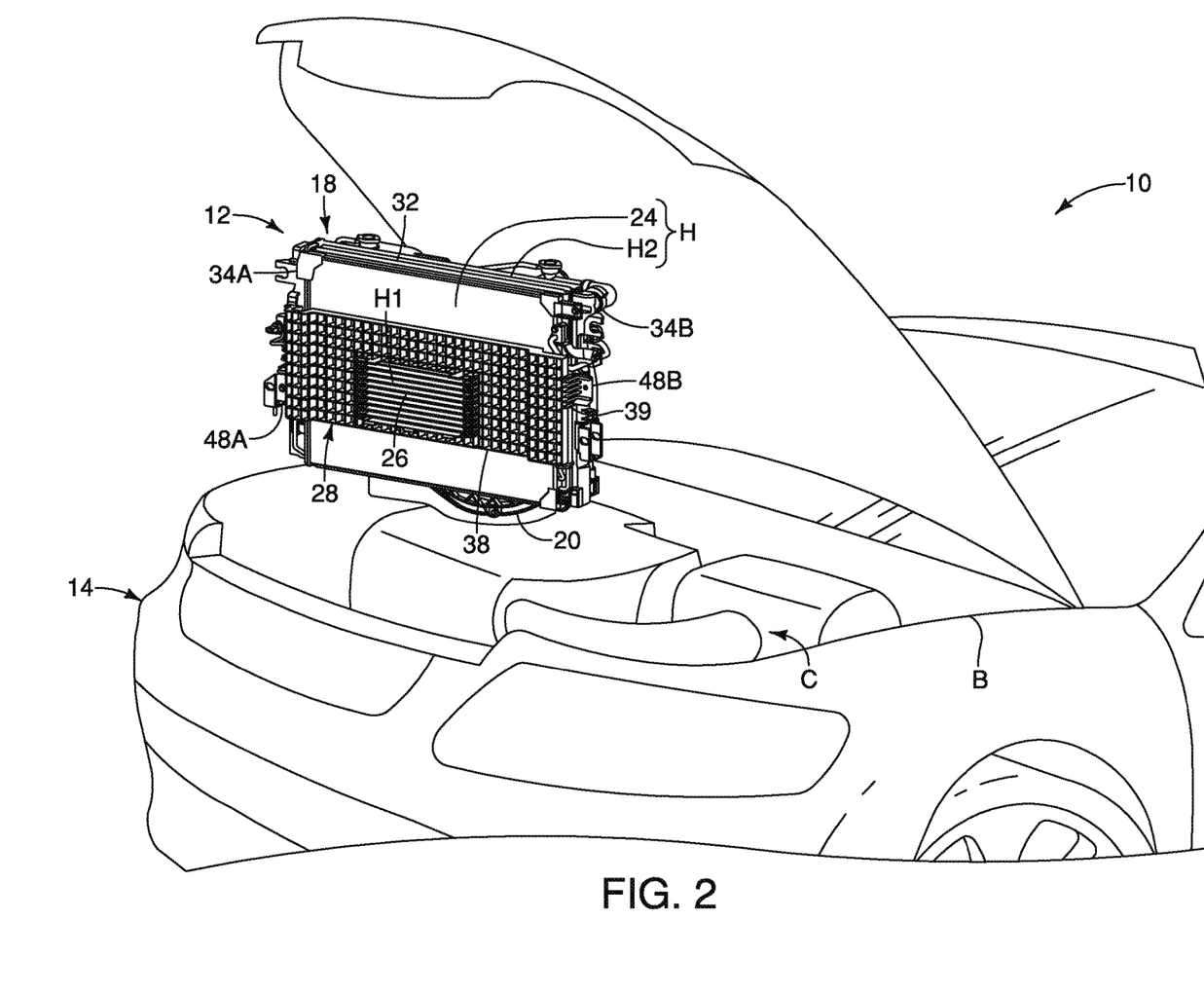
FIG. 2 is an enlarged view of the vehicle of FIG. 1 equipped with a front end module assembly in accordance with an illustrated embodiment.

Referring to FIG. 2, the vehicle 10 of FIG. 1 is illustrated as having a front end module assembly 12 in accordance with an illustrated embodiment. As shown in FIG. 2, the front end module assembly 12 is fixed to the vehicle's engine compartment C at a vehicle front end 14. The front end module assembly 12 includes one or more heat exchangers H and is primarily provided to the vehicle 10 for intaking air from the environment and cooling the air, as will be further discussed below.

In particular, the front end module assembly 12 comprises one or more front end module structures 18 that can include, for example, a fan 20, a radiator unit 22, a condenser unit 24, as well as any mounting or attachment frames for securing the front end module assembly 12 to the vehicle body structure B. In other words, the fan 20, the radiator unit 22, the condenser unit 24 and the attachment frames, such as the frame structure F of FIG. 1, can be considered front end module structures 18 of the illustrated embodiment. The front end module assembly 12 further includes a transmission cooler 26 that will be further described below.

Figure 3:
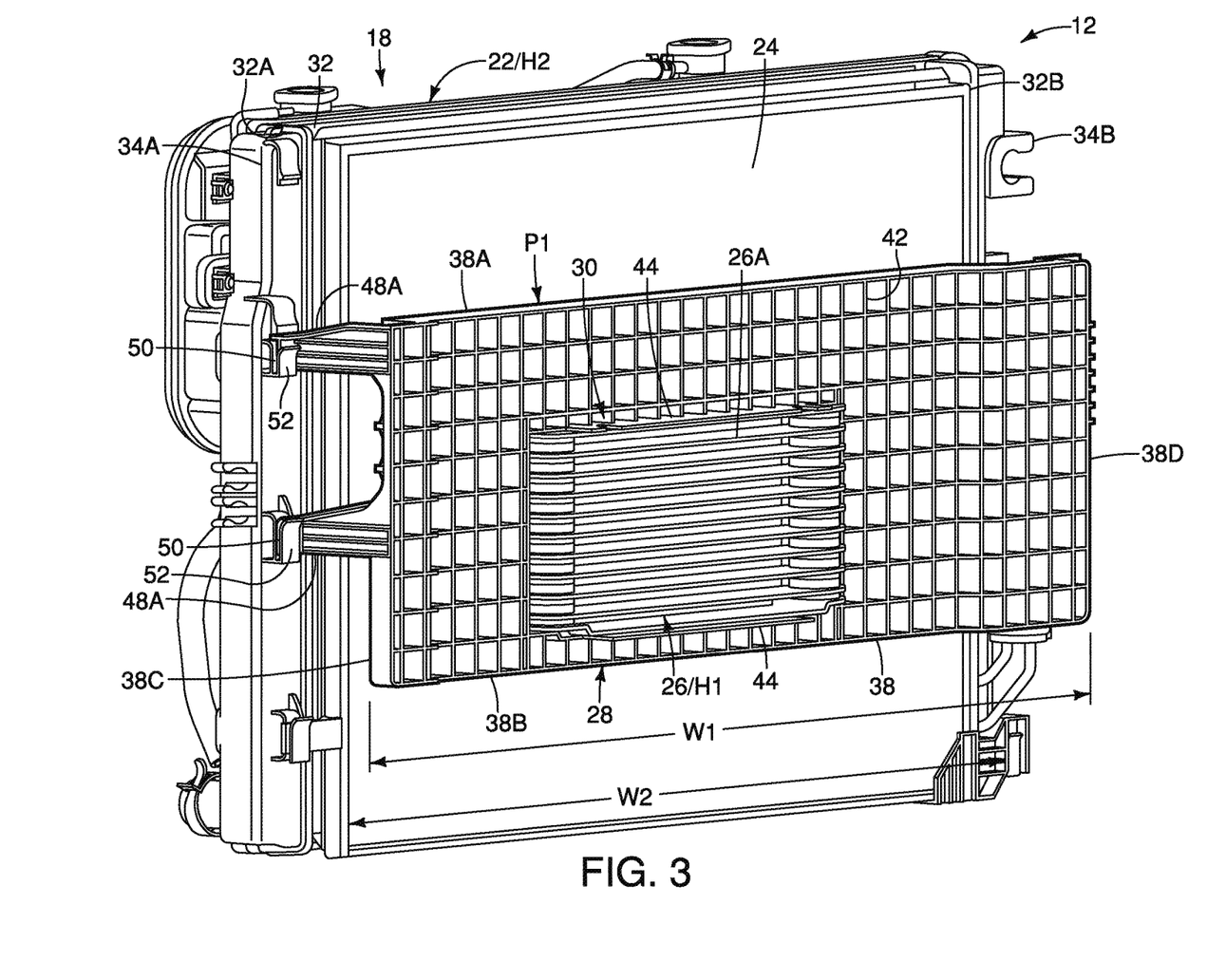
FIG. 3 is a perspective view of the front end module assembly of FIG. 2.
Figure 4:
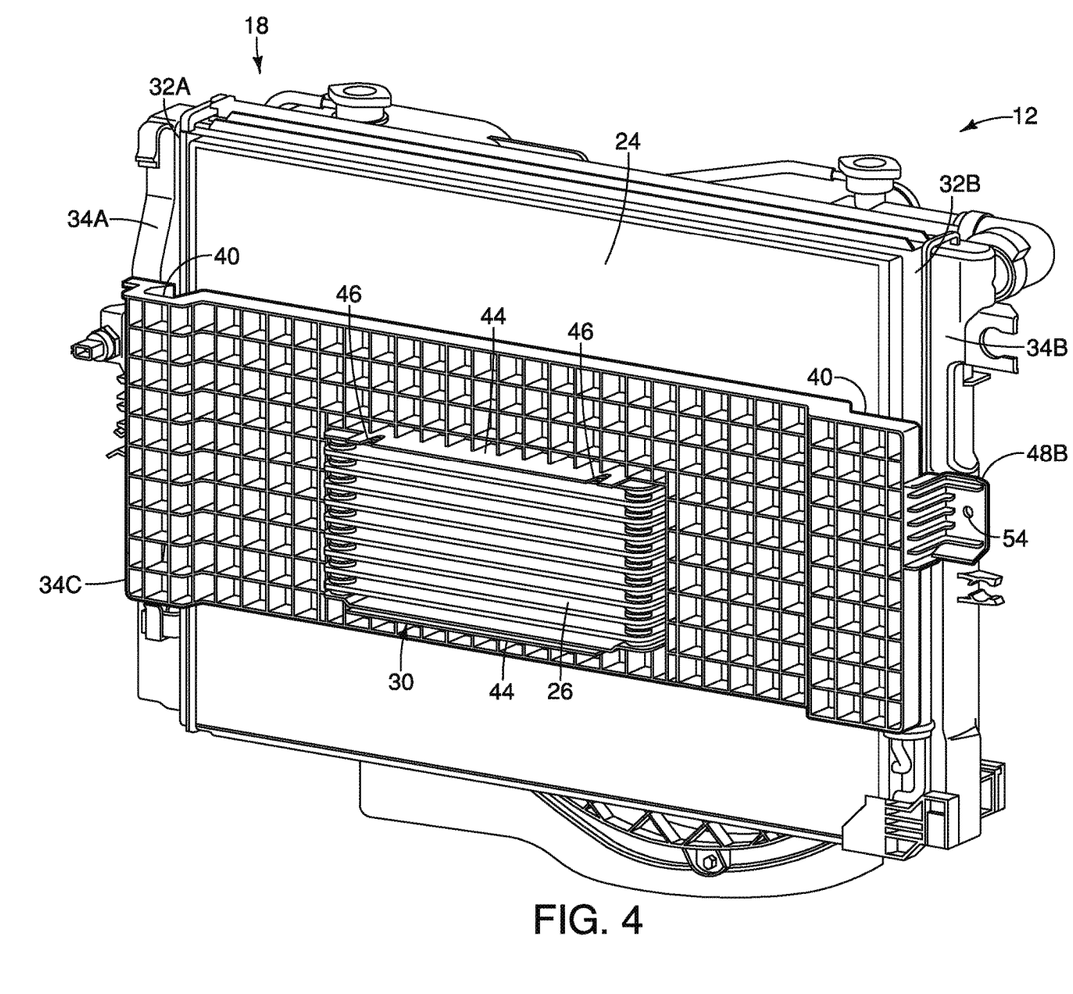
FIG. 4 is another perspective view of the front end module assembly of FIGS. 2 and 3.

In the illustrated embodiment, the front end module assembly 12 further includes a heat exchanger support 28 and a first heat exchanger unit H1. In particular, the heat exchanger support 28 is provided for the transmission cooler 26 that is considered the first heat exchanger unit H1 of the illustrated embodiment. In other words, in the illustrated embodiment, the first heat exchanger unit H1 of the front end module assembly 12 is the transmission cooler 26. As best seen in FIGS. 3 and 4, the heat exchanger support 28 supports the first heat exchanger unit H1 to another front end module structure 18 of the front end module assembly 12.

In particular, in the illustrated embodiment, the heat exchanger support 28 secures the transmission cooler 26 to the radiator unit 22 that is considered a second heat exchanger H2 of the illustrated embodiment. In other words, in the illustrated embodiment, the second heat exchanger unit H2 of the front end module assembly 12 is the radiator unit 22. It will be apparent to those skilled in the vehicle field from this disclosure that the heat exchanger support 28 can alternatively or additionally be supported to any of the other front end module structures 18 such as the condenser unit 24 or any of the additional brackets and/or frames F of the front end module assembly 12.

Figure 7:
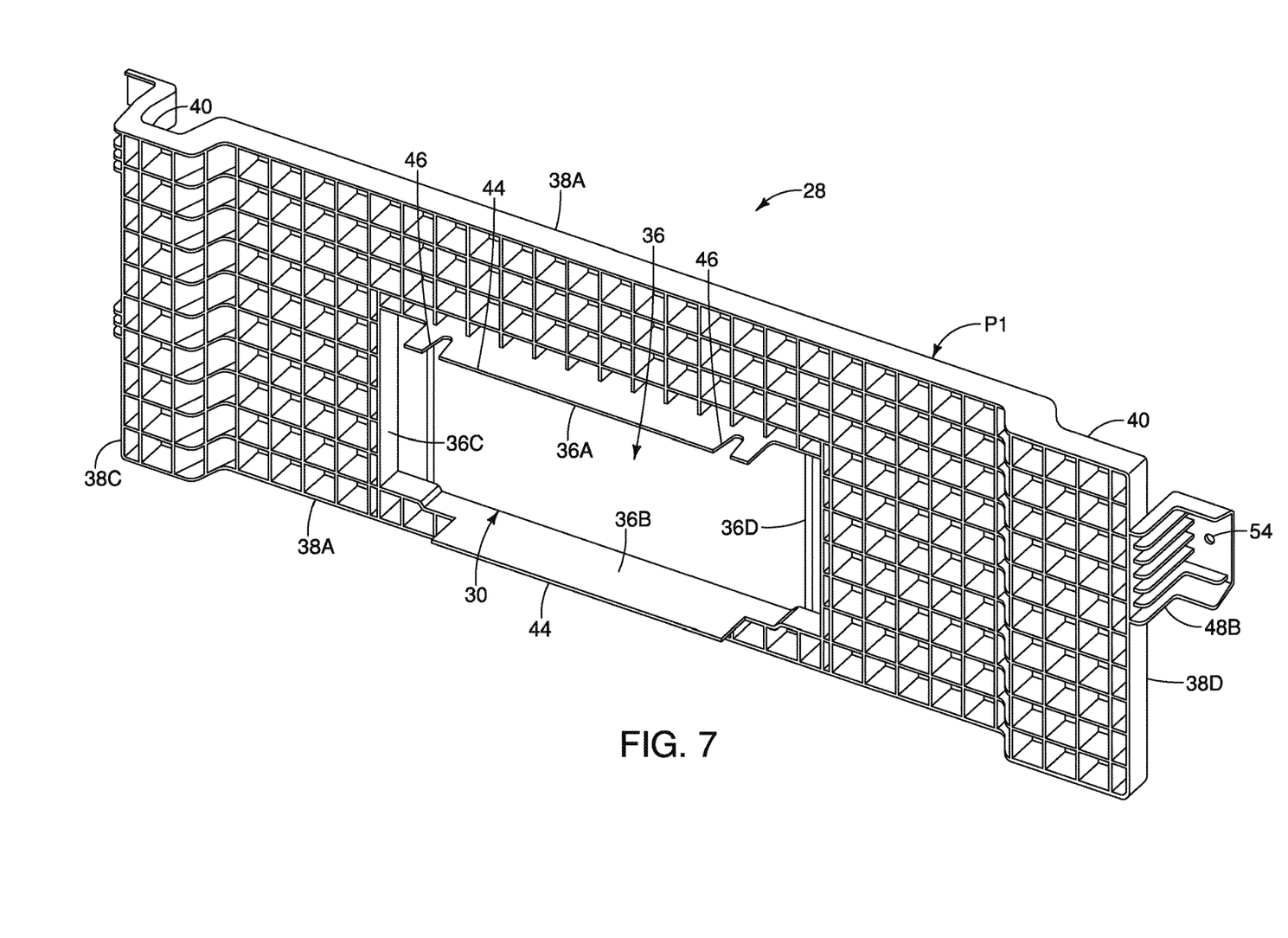
FIG. 7 is a perspective view of the heat exchanger support.
Figure 8:
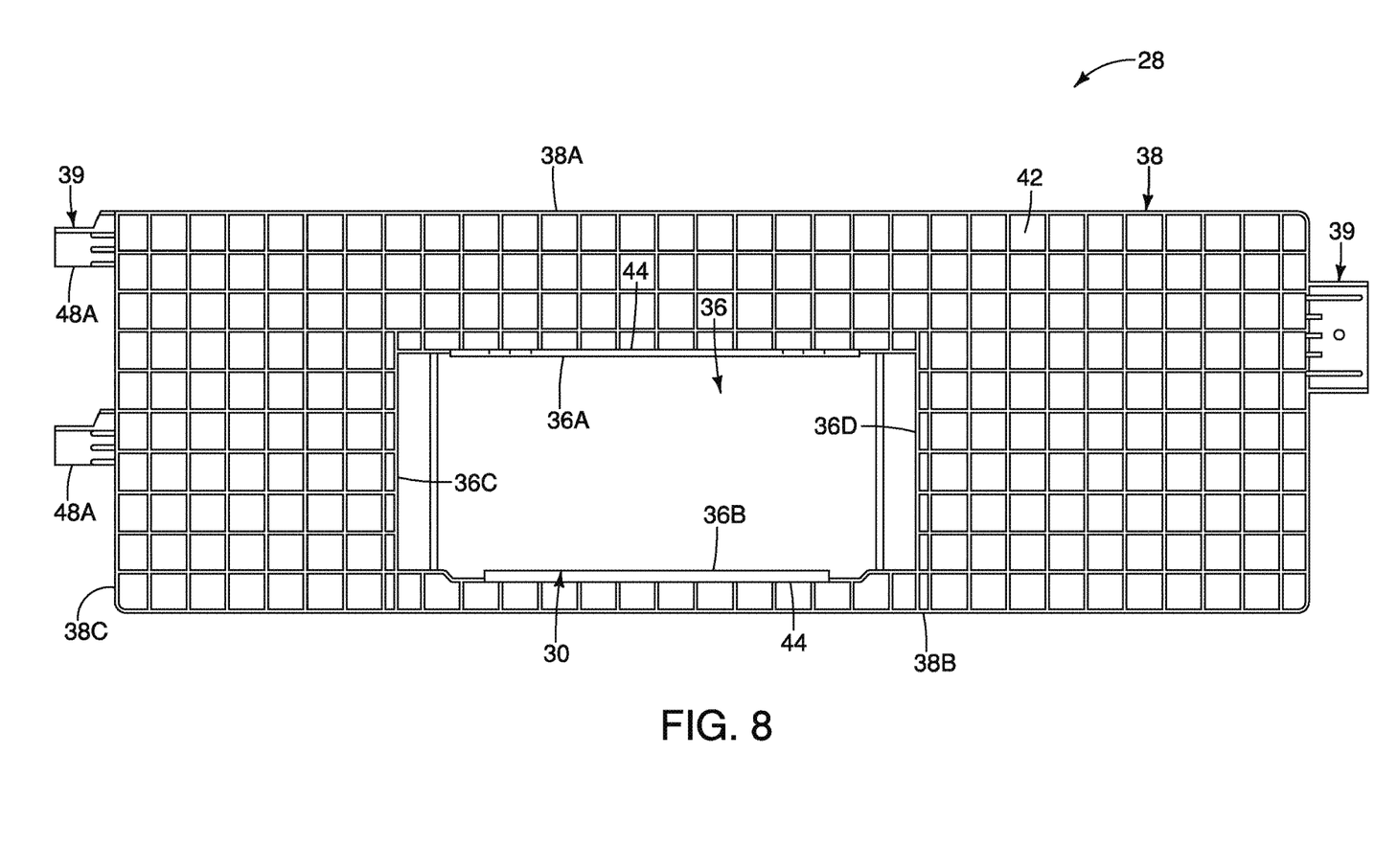
FIG. 8 is a front plan view of the heat exchanger support.

As best seen in FIGS. 7 and 8, the heat exchanger support 28 has an accommodating portion 30 for receiving the transmission cooler 26. The transmission cooler 26 is accommodated in the accommodating portion 30 of the heat exchanger support 28 so that the transmission cooler 26 is supported to the vehicle front end module structure 18 via the heat exchanger support 28. In the illustrated embodiment, the heat exchanger support 28 is a rigid framework that anchors the first heat exchanger unit H1 to the vehicle front end module assembly 12 at a desired position. The heat exchanger support 28 and the transmission cooler 26 will be further discussed in detail below.

Referring to FIGS. 2 to 4, the front end module assembly 12 is part of a temperature control system of the vehicle 10 for maintaining a desired temperature of the vehicle's 10 electronic components, such as to prevent the engine from overheating. For example, the condenser unit 24 is a heat exchanger that is part of the heating, ventilation and air conditioning (HVAC) system of the vehicle 10. The condenser unit 24 intakes warm or hot air out of passenger compartment where it is cooled by the refrigerant of the condenser unit 24. The cooler air is then recirculating to the passenger compartment through the HVAC.

The radiator unit 22 cools the vehicle's 10 engine by receiving and cooling hot liquid from the engine. As best seen in FIGS. 3 and 4, the radiator unit 22 has a radiator core 32 and a pair of first and second radiator tanks 38A and 34B. In the illustrated embodiment, the heat exchanger support 28 supports the transmission cooler 26 to the radiator unit 22 as will be further described below. Therefore, the radiator unit 22 can be considered the second heat exchanger unit H2 of the front end module assembly 12. Thus, in the illustrated embodiment, the front end module structure 18 includes at least one second heat exchanger unit H2 (hereinafter the radiator unit 22). However, it will be apparent to those skilled in the vehicle field from this disclosure that the heat exchanger support 28 can support the transmission cooler 26 to other components of the vehicle front end module assembly 12 as needed and/or desired.

As best seen in FIGS. 3 and 4, the radiator core 32 has a first end 32A, a second end 32B. The first and second ends 32A and 32B are opposite lateral ends of the radiator core 32. The radiator core 32 consists of many small tubes (not shown) that can be equipped with a honeycomb of cooling fins to dissipate heat rapidly. As seen in FIG. 3, the first radiator tank 34A is fluidly coupled to the first end 32A of the radiator core 32 by bolts or any other suitable fastening members. As seen in FIG. 4, the second radiator tank 34B is fluidly coupled to the second end 32B of the radiator core 32 by bolts or any other suitable fastening members. Fluid flows between the interior of the first and second radiator tanks 38A and 34B and the interior of the radiator core 32 where the fluid is cooled.

The radiator unit 22 preferably further includes a radiator core 32 support, such as the frame seen in FIG. 1. The radiator core 32 support is a metal or plastic structure that serves as a body frame for the radiator core 32 and the first and second radiator tanks 38A and 34B. Therefore, the front end module assembly 12 can further include the radiator core support (e.g., the frame F) for fixing the components of the radiator unit 22 and other structures to the vehicle body structure B. It will be apparent to those skilled in the vehicle field from this disclosure that the heat exchanger support 28 can alternatively support the transmission cooler 26 to the radiator core support as needed and/or desired.

As best seen in FIGS. 3 to 6, the transmission cooler 26 is accommodated in an opening 36 of the heat exchanger support 28 so that the transmission cooler 26 is supported to the vehicle front end module structure 18 via the heat exchanger support 28, as discussed below. The transmission cooler 26 is a heat exchanger that uses engine coolant to cool the transmission oil. The transmission cooler 26 can utilize a plate-and-fin structure in which the fins are stacked between oil channels to transfer heat from the transmission oil in order to cool the transmission oil.

As shown in FIG. 2, the transmission cooler 26 is positioned at a location in front of the condenser unit 24 and the radiator unit 22. That is, the transmission cooler 26 is positioned closer to the vehicle's front end 14 than the condenser unit 24 and the radiator unit 22 are positioned to the vehicle's front end 14. The transmission cooler 26 is positioned at the effective frontal area of the front end module assembly 12. In other words, the heat exchanger support 28 is a bracket that positions the transmission cooler 26 in a vehicle forward direction with respect to the radiator unit 22 and the condenser unit 24. The heat exchanger support 28 positions the transmission cooler 26 at a position that receives incoming air into the engine compartment C when the vehicle is in use. Preferably, the heat exchanger support 28 is configured to hold the transmission cooler 26 substantially at a center location of the vehicle front end module assembly 12. This way, the transmission cooler 26 is positioned to receive ample air flow so that incoming air and air from the cooling fans to cool the transmission oil effectively.

As best seen in FIGS. 7 and 8, the heat exchanger support 28 includes a frame portion 38 and a bracket portion 39 that extends from an outer perimeter P1 of the frame portion 38. The frame portion 38 and the bracket portion 39 are preferably made of a lightweight, rigid material such as plastic. The outer perimeter P1 of the frame portion 38 substantially defines an overall outer shape of the heat exchanger support 28. The outer perimeter P1 of the frame portion 38 is defined by a top side 38A, a bottom side 38B and a pair of first and second lateral sides 38C and 38D of the frame portion 38. The bracket portion 39 extends from the frame portion 38 in the vehicle rearward direction to be coupled to the radiator unit 22.

Figure 5:
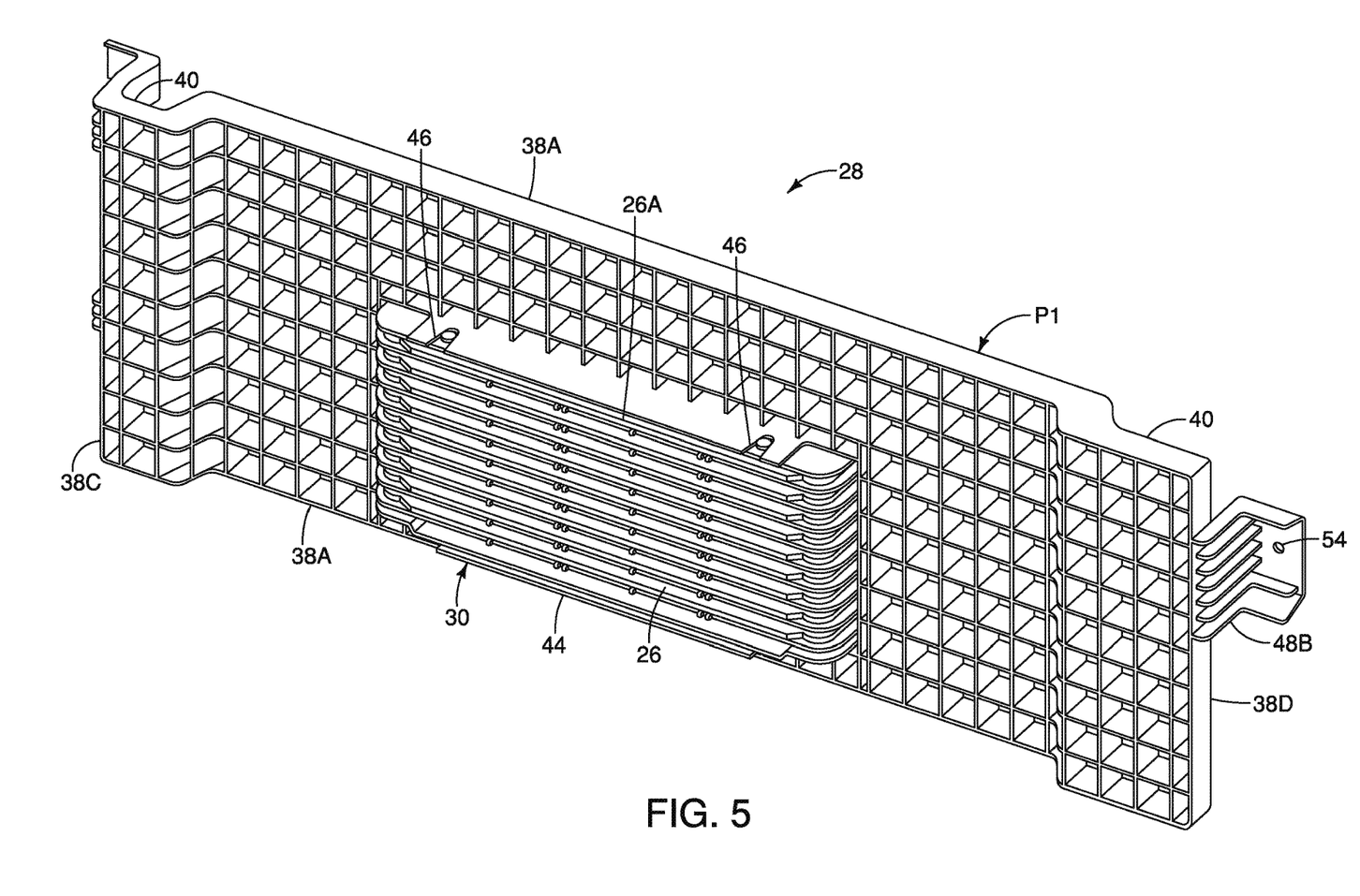
FIG. 5 is a perspective view of a heat exchanger support of the front end module assembly supporting a heat exchanger of the front end module assembly.
Figure 6:
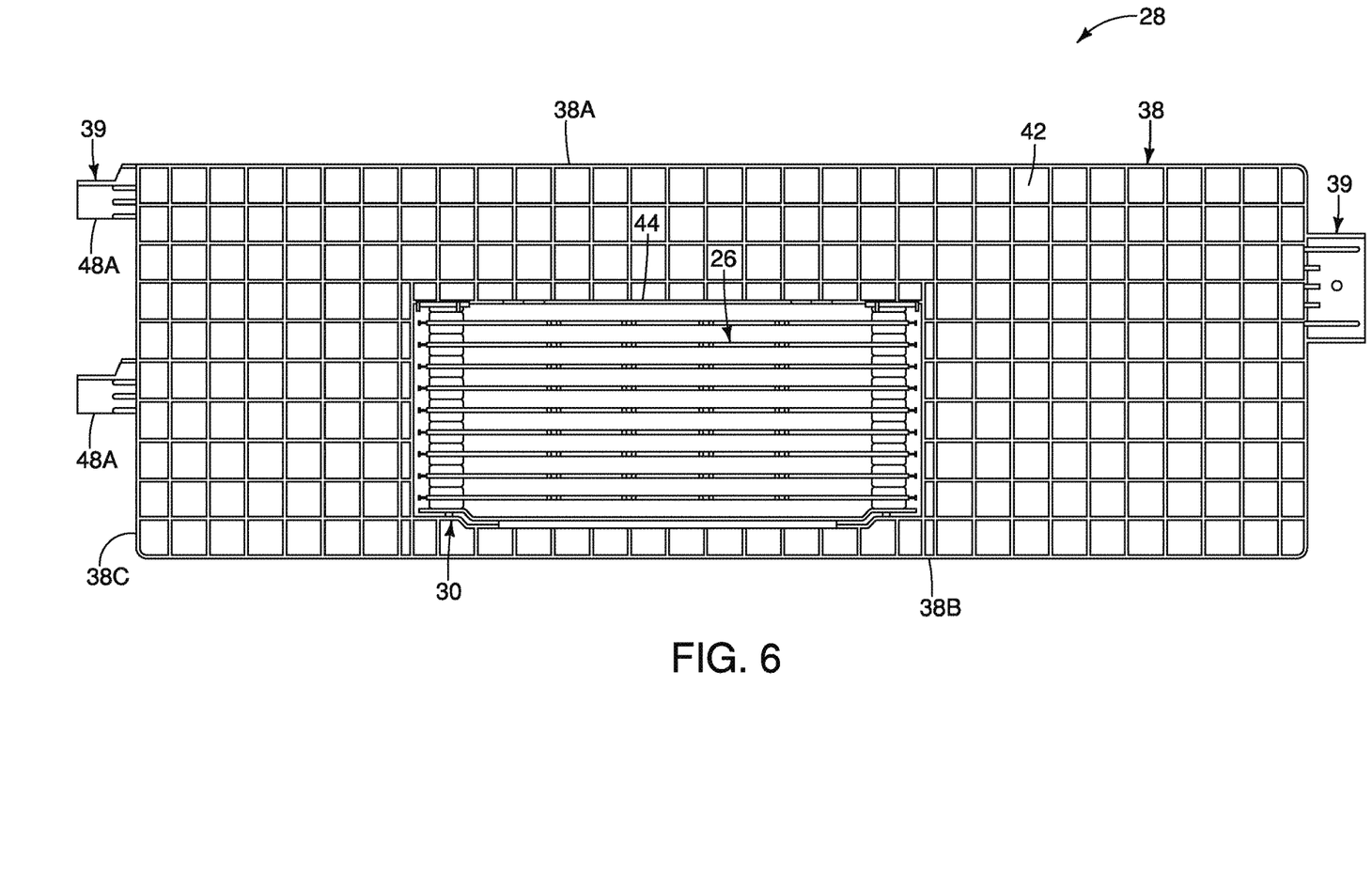
FIG. 6 is a front plan view of the heat exchanger support supporting the heat exchanger.

As best seen in FIGS. 4 and 5, the frame portion 38 includes curved portions 40 in order to accommodate an overall shape of the front end module assembly 12. The curved portions 40 protrude in a forward direction with respect to the accommodating portion 30 such that the accommodating portion 30 substantially abuts the condenser unit 24. This arrangement allows the bracket portion 39 of the heat exchanger support 28 to attach to the radiator tanks 34A and 34B while saving materials and space. A space between the curved portions 40 and the condenser unit 24 can be utilized as a conduit channel for fitting tubes or other components of the vehicle front end module assembly 12 as necessary and shown in at least FIG. 4. The bracket portion 39 extends from the first and second lateral sides 38C and 38D of the frame portion 38. However, it will be apparent to those skilled in the vehicle field from this disclosure that the bracket portion 39 can protrude from the top and bottom sides 38A and 38B to be coupled with the vehicle front end structure 18 as needed and/or necessary.

As seen in FIGS. 2 to 4, the frame portion 38 has a maximum width W1 that is defined by a distance between the first and second lateral sides 38C and 38D of the frame portion 38. The maximum width W1 of the frame portion 38 substantially corresponds to a width W2 of the front end module assembly 12. Therefore, the heat exchanger support 28 has the maximum width W1 that spans substantially a maximum width W2 of the front end module structure 18. In other words, the heat exchanger support 28 spans substantially the entire width W2 of the front end module structure 18. The outer perimeter P1 of the frame portion 38 is smaller than an outer perimeter of the second heat exchanger unit H2. That is, the outer perimeter P1 of the frame portion 38 is less than the outer perimeter of the radiator unit 22 to decrease the overall size of the heat exchanger support 28 with respect to the front end module structure 18. In particular, the heat exchanger support 28 serves as a mounting structure for anchoring the first and second heat exchanger units H1 and H2 while decreasing the weight and bulkiness of the heat exchanger support 28.

Referring to FIGS. 7 and 8, the heat exchanger support 28 has the opening 36 that defines the accommodating portion 30 for accommodating the transmission cooler 26. Therefore, the opening 36 is sized and configured to substantially correspond to the size and shape of the transmission cooler 26 for containing the transmission cooler 26. The shape and size of the opening 36 is defined by an outer perimeter of the opening 36. The opening 36 has a top edge 36A, a bottom edge 36B, and a pair of first and second lateral edges 36C and 36D that together define the outer perimeter P2 of the opening 36. The frame portion 38 includes a plurality of apertures 42 spanning from the opening 36 to the outer perimeter of the frame portion 38. The apertures 42 form a mesh of the frame portion 38. In other words, the frame portion 38 has a lattice framework or net-like pattern that is formed by the apertures 42.

The apertures 42 are air flow apertures that allow air to flow through the heat exchanger support 28 to be received by the heat exchangers H of the front end vehicle module assembly 12. With this structure, the heat exchanger support 28 mounts the transmission oil cooler to the vehicle front end module assembly 12 without blocking the forward area of the radiator unit 22 and the condenser unit 24. In this way, the heat exchanger support 28 of the illustrated embodiment allows air to pass through the heat exchanger support 28 so to minimize blockages to the forward area of the radiator unit 22 and the condenser unit 24. It will be apparent to those skilled in the vehicle field from this disclosure that the apertures 42 can have any shape or size to enable airflow therethough.

As best seen in FIG. 7, the accommodating portion 30 includes one or more extensions that serve as retention arms 44 for securing the transmission cooler 26 in the opening 36.

As shown, the retention arms 44 extend from the top and bottom edge 36Bs of the opening 36. However, it will be apparent to those skilled in the vehicle field from this disclosure that the retention arms 44 can extend from the lateral edges 36C and 36D. It will also be apparent to those skilled in the vehicle field from this disclosure that the accommodating portion 30 can have retention arms 44 of varying numbers, shapes and sizes for retaining the transmission cooler 26 in place. In the illustrated embodiment, as best seen in FIGS. 5 and 7, the retention arms 44 can include slots 46 or openings for receiving a corresponding extension of the transmission cooler 26 to detachably secure the transmission cooler 26 in the opening 36.

For example, the upper surface of transmission cooler 26 can be attached to threaded studs such that the studs fit in slots 46. The threaded studs can be secured therein by nut(s) which can clamp the retention arms 44 between the nut and the transmission cooler 26. Although the slot 46 is only shown on upper arm 44, it will be apparent to those skilled in the vehicle field from this disclosure that the heat exchanger support 28 can be provided with slots 46 located on lower arm 44 with corresponding threaded studs to secure the lower arm 44 to the radiator unit 22. Alternatively, the retention arms 44 can clip or clasp the transmission cooler 26 in place by clasping to any one of the stacked fins 26A of the transmission cooler 26. It will also be apparent to those skilled in the vehicle field from this disclosure that the transmission cooler 26 can be clipped, clasped or retained in the accommodating portion 30 by a variety of methods as appropriate.

Referring to FIGS. 3 and 5, the heat exchanger support 28 includes one or more supporting arms 48A and 48B for supporting the heat exchanger support 28 to the vehicle front end module structure 18. In particular, the bracket portion 39 includes the supporting arms 48A and 48B that extend from the first and second lateral sides 38C and 38D of the frame portion 38 in the rearward direction towards the radiator unit 22. In this way, the heat exchanger support 28 is mounted closer to the vehicle front end 14 than the front end module structure 18 is to the vehicle front end 14.

As shown, the heat exchanger support 28 includes at least one first support arm 48A extending from the first lateral side 38C of the frame portion 38 and is detachably coupled to the first radiator tank 34A. Therefore, the heat exchanger support 28 includes the first support arm 48A that extends from the outer perimeter P1 of the frame portion 38 to be attached to the vehicle front end structure 18. In the illustrated embodiment, the heat exchanger support 28 includes a pair of identical first support arms 48A that serve as brackets for supporting the frame portion 38 to the first radiator tank 34A. However, it will be apparent to those skilled in the vehicle field from this disclosure that additional or fewer supporting arms 48A and 48B can be implemented with heat exchanger support 28.

The heat exchanger support 28 also includes at least one second support arm 48B extending from the second lateral side 38D of the frame portion 38 and is detachably fixed to the second radiator tank 34B. The second support arm 48B serves as a bracket for supporting the frame portion 38 to the second radiator tank 34B. The first support arm 48A and the second support arm 48B extends in the vehicle rearward direction from the accommodating portion 30 of the heat exchanger support 28 with respect to the transmission cooler 26. It will be apparent to those skilled in the vehicle field from this disclosure that the bracket portion 39 can include as many supporting arms from either first and second lateral sides as needed and/or necessary for securing the heat exchanger support 28 to the vehicle front end module structure 18.

As best seen in FIG. 3, the first support arms 48A are each received by a corresponding receiving slots 50 of the first radiator tank 34A. Therefore, the first radiator tank 34A includes at least one slot 50 that receives the first support arms 48A. In particular, the radiator unit 22 includes a pair of brackets 52 that each include slot(s) 50 or receptacle(s) for receiving a portion of the first supporting arms 48A. That is, the first radiator tank 34A can include attachment structures, such as brackets, holders, slots, etc. for being coupled to a part of the first supporting arms 48A.

As best seen in FIG. 4, the second support arm 48B includes a through hole 54 that is configured to receive a fastener (not shown) for fastening the second support arm 48B to the second radiator tank 34B. Therefore, the heat exchanger support 28 can be mounted to the front end module structure 18 via fasteners such as bolts or rivets. It will be apparent to those skilled in the vehicle field from this disclosure that the heat exchanger support 28 can be detachably or fixedly coupled to the components of the vehicle front end module assembly 12 via a variety of attachment means as is appropriate.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle front end module assembly. Accordingly, these terms, as utilized to describe the present invention should be interpreted relative to a vehicle equipped with the vehicle front end module assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front end module assembly comprising:
   a front end module structure of a vehicle;
   a heat exchanger support supported to the vehicle front end module structure, the heat exchanger support having a pair of first and second lateral sides that supports substantially an entirety of the weight of the heat exchanger to the front end module structure, the heat exchanger support having an opening; and
   a first heat exchanger unit that is accommodated in the opening of the heat exchanger support so that the first heat exchanger unit is supported to the vehicle front end module structure via the heat exchanger support.

2. The front end module assembly according to claim 1, wherein
   the vehicle front end module structure includes a second heat exchanger unit.

3. The front end module assembly according to claim 2, wherein
   the heat exchanger support includes a frame portion that has the opening, an outer perimeter of the frame portion being smaller than an outer perimeter of the second heat exchanger unit.

4. The front end module assembly according to claim 3, wherein
   the second heat exchanger unit is a radiator unit having a radiator core and a pair of first and second radiator tanks.

5. The front end module assembly according to claim 4, wherein
   the heat exchanger support is supported to the radiator unit.

6. The front end module assembly according to claim 5, wherein
   the first radiator tank is fixed to a first lateral side of the radiator core and the second radiator tank is fixed to a second lateral side of the radiator core, the first and second lateral sides being opposite lateral sides of the radiator core.

7. The front end module assembly according to claim 6, wherein
   the heat exchanger support includes at least one first support arm extending from the first lateral side of the frame portion that is fixed to the first radiator tank, the heat exchanger support includes at least one second support arm extending from the second lateral side of the frame portion that is fixed to the second radiator tank.

8. The front end module assembly according to claim 1, wherein
   the heat exchanger support has a maximum width that spans substantially a maximum width of the front end module structure.

9. The front end module assembly according to claim 1, wherein
   the heat exchanger support is mounted closer to a vehicle front end than the front end module structure.

10. The front end module assembly according to claim 4, wherein
    the heat exchanger support includes at least one first support arm extending from the first lateral side of the heat exchanger support that is fixed to the first radiator tank, the heat exchanger support includes at least one second support arm extending from the second lateral side of the heat exchanger support that is fixed to the second radiator tank.

11. The front end module assembly according to claim 10, wherein
the first radiator tank includes at least one slot that receives the at least one first support arm.

12. The front end module assembly according to claim 11, wherein
the at least one second support arm includes a through hole that is configured to receive a fastener for fastening the at least one second support arm to the second radiator tank.

13. The front end module assembly according to claim 3, wherein the frame portion includes a plurality of apertures spanning from the opening to the first and second lateral sides and to a top and bottom side of the frame portion that together define an outer perimeter of the frame portion.

14. A heat exchanger assembly, comprising:
a heat exchanger support configured to be supported to a vehicle front end module structure, the heat exchanger support spanning substantially an entire width of the front end module structure, the heat exchanger support having an accommodating portion, the heat exchanger support having a pair of first and second lateral sides that supports substantially an entirety of the weight of the heat exchanger to the front end module structure when the heat exchanger support is supported to the vehicle front end module; and
a transmission cooler that is accommodated in the accommodating portion of the heat exchanger support so that the transmission cooler is configured to be supported to the vehicle front end module structure via the heat exchanger support.

15. The heat exchanger assembly according to claim 14, wherein
the heat exchanger support includes at least one first support arm extending from the first lateral side of the heat exchanger support that is fixed to a first lateral side of the front end module structure, the heat exchanger support includes at least one second support arm extending from the second lateral side of the heat exchanger support that is fixed to a second lateral side of the front end module structure that is opposite of the first lateral side of the front end module structure.

16. The heat exchanger assembly according to claim 15, wherein
the least one first support arm and the at least one second support arm extends in a vehicle rearward direction from the accommodating portion of the heat exchanger support with respect to the transmission cooler.

17. The heat exchanger assembly according to claim 15, wherein
the least one first support arm is configured to be received by a receiving slot of the vehicle front end module structure.

18. The heat exchanger assembly according to claim 17, wherein
the at least one second support arm includes a through hole for receiving a fastener that fastens the heat exchanger support to the vehicle front end module.

19. A heat exchanger support, comprising:
a frame portion having an opening for accommodating a heat exchanger unit; and
at least one first support arm extending from a pair of first and second lateral sides of the frame portion to be attached to a vehicle front end structure, the frame portion including a top wall, a bottom wall, and a plurality of apertures spanning from the opening to an outer perimeter of the frame portion defined by the first and second lateral sides and a top and bottom side of the frame portion, the apertures having a depth that corresponds a depth of the top wall and a depth of the bottom wall.

20. The heat exchanger support according to claim 19, wherein
the plurality of apertures form a mesh of the frame portion.

* * * * *